United States Patent [19]

Mego, Jr. et al.

[11] 3,975,692

[45] Aug. 17, 1976

[54] CONTROL OF LASER OUTPUT CHARACTERISTICS BY FLUID STREAMS

[75] Inventors: Alexander Mego, Jr., Pittsburgh; John D. Feichtner, Murrysville, both of Pa.

[73] Assignee: Westinghouse Electric Corporation, Pittsburgh, Pa.

[22] Filed: Feb. 28, 1975

[21] Appl. No.: 554,273

Related U.S. Application Data

[63] Continuation of Ser. No. 376,851, July 5, 1973, abandoned.

[52] U.S. Cl. .......................... 331/94.5 M; 350/285
[51] Int. Cl.² ........................................... H01S 3/10
[58] Field of Search .......... 331/94.5; 350/160, 161, 350/179, 285, 312

[56] References Cited
UNITED STATES PATENTS

| | | |
|---|---|---|
| 3,437,951 | 4/1969 | Dailey .............................. 350/160 |
| 3,582,184 | 6/1971 | Golden et al. ...................... 350/285 |
| 3,606,523 | 9/1971 | Taylor et al. ....................... 350/179 |
| 3,609,004 | 9/1971 | Taylor ................................ 350/312 |

*Primary Examiner*—William L. Sikes
*Attorney, Agent, or Firm*—D. Schron

[57] ABSTRACT

A method and means for controlling the output characteristics of a laser in which the optical axis of the laser output, either within the optical cavity of said laser or outside of said cavity, is transected with a fluid stream. The laser output may either be transected with a fluidic jet such as a jet of gas to modulate the output characteristics or the laser beam positioned by means of a directed flow of liquid across the optical axis thereof.

15 Claims, 5 Drawing Figures

CONTROL OF LASER OUTPUT CHARACTERISTICS BY FLUID STREAMS

This is a continuation of application Ser. No. 376,851, filed July 5, 1973 and now abandoned.

FIELD OF THE INVENTION

The present invention relates to a method and means for controlling laser output characteristics utilizing gas jets or liquid streams.

BACKGROUND OF THE INVENTION

Mechanical, electrical and passive devices and techniques have been known and used for many years to modulate the output of lasers. Common mechanical techniques include the use of in-cavity choppers, rotating mirrors, prisms and the like. Kerr cells, Pockel's cells, and acousto-optical devices have been used to electrically control laser output characteristics. Bleachable dyes and other nonlinear elements have functioned as passive means for output modulation of lasers.

Also of recent interest are optical switches wherein laser output beams of desired power can be terminated by means of selectable gas pressures contained within a chamber through which the beam is focused; U.S. Pat. No. 3,433,555. Beams of collimated light have been caused to reflect within a transparent member by passage through slots formed therein of a fluid having an index of refraction less than the transparent material. Thus, by proper selection of the fluid and slots, the reflections can be controlled to position the output of the beam from the material; U.S. Pat. No. 3,537,643. Other devices of interest include those described in U.S. Pat. Nos. 3,121,169 and 3,625,593. The latter patent is of particular interest in that a means for the electrical control of light polarization is disclosed comprising in the path of a polarized light beam, a transparent container in which at least two optically active fluids are provided for rotating the plane of polarized light.

It is an object of the present invention to provide a means for modulating the output of a laser by means less susceptible to damage and thus capable of controlling high power output than state of the art devices. A further object of the invention is to provide a means for modulating a laser output which is more versatile and controllable than passive systems and much simpler and cheaper than electrical systems.

SUMMARY OF THE INVENTION

The present invention provides a means and method for modulating and/or positioning output characteristics of a laser by means of fluidic jets or flowing liquid streams positioned to transect the optical axis of the laser output beam. The fluidic jets as well as the flowing streams of the present invention are controllable by means of fluidic circuits through which they flow.

Generally, the present invention comprises the introduction of a fluidic jet or stream into the optical path within the laser cavity or the optical path of a continuous wave laser beam. By means of the introduction of a controlled gas jet across the optical path in a laser cavity, refractive gradients are created therein which cause scattering losses which are used to turn the laser on or off or provide a random "Q-switched" output. With the fluid jet or jets off, the CW pumped system operates at a stable DC output level in its normal manner.

Alternatively, the fluid introduced to a jet nozzle in the optical cavity can be directed through a fluidic oscillator circuit to provide a pulsating jet of fluid. The laser output resulting from the beam passing through the pulsating jet of fluid is a pulsed beam having the frequency of the oscillator circuit. Modulation of ± 80 percent about the DC CW level is readily obtained in this manner.

In another embodiment of the invention, a fluid is directed through a transparent channel or tube positioned across the optical axis of a laser beam. For example, a transparent liquid can be directed through the channel to which is added a laser frequency absorbing dye. One method and means for adding the dye is shown and described in U.S. Pat. No. 3,832,649, issued Aug. 27, 1974 assigned to the assignee of the present invention. The laser dye can be selected to absorb at the laser output frequency or selected to vary the output characteristics of the laser beam. Alternatively, one or a number of transparent prismatic channels are positioned within or outside of the optical cavity and normal to the optical axis. These channels are utilized to position the laser beam path by the selective flow of a fluid through one or a number of said channels. In addition to beam positioning, the plurality of prismatic channels are also adaptable to frequency-key the oscillation of a multi-line laser such as an argon or krypton laser.

Other advantages of the present invention will become apparent from a perusal of the following detailed description of presently preferred embodiments taken in connection with the accompanying drawings.

PREFERRED EMBODIMENTS

Figure 1:
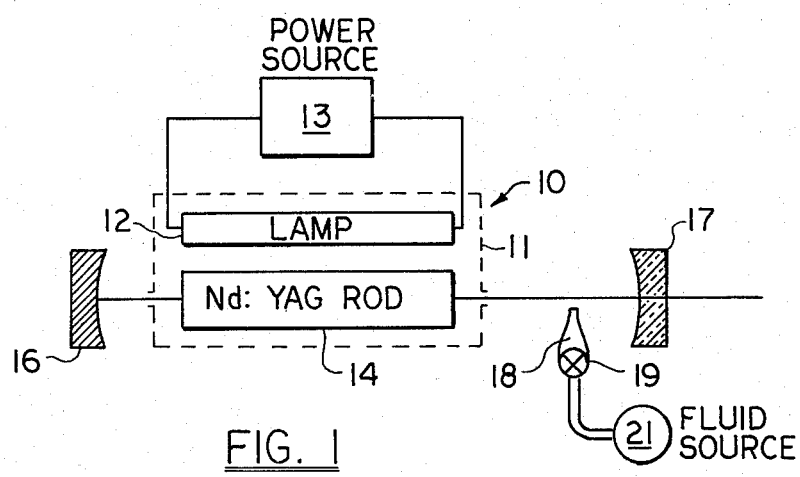
FIG. 1 is a diagrammatic view of a fluidic jet means positioned within the optical cavity of a pumped Nd:YAG laser rod.

With reference to FIG. 1, a device including a CW laser, the output from which is modulated by a fluidic jet positioned within the optical cavity thereof is diagrammatically shown. Device 10 includes a pump radiation enclosure 11 comprising lamp pump 12 connected to a power source 13. Lamp 12 is utilized to pump rod 14, preferably a Nd:YAG rod to produce a CW laser output at $1.06\mu$. A pair of optical feedback mirrors 16 and 17, 100 percent reflective and 98 percent reflective, respectively, are positioned along the optical axis of device 10.

Positioned within the optical cavity of device 10, between rod 14, mirror 17 and below the optical axis, is a fluidic jet nozzle 18 for the introduction of a gas jet across the optical axis of device 10. Nozzle 18 is connected through valve 19 to a fluid source 21. Fluid source 21 comprises a pressurized source of gas, preferably dichlorodifluoromethane or another gas having a high index of refraction at the laser wavelength. Valve 19 is utilized for selectively controlling the flow of gas from source 21 to nozzle 18. By replacing valve 19 with a fluidic oscillator circuit of a type well known in the art, the gas can be pulse injected into the optical path of the laser beam.

Figure 2:
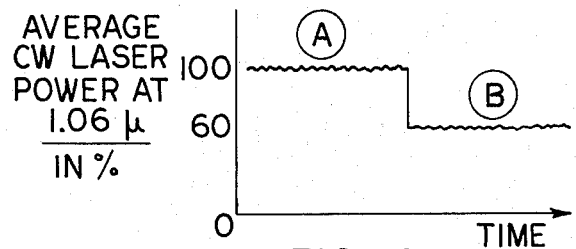
FIG. 2 is a graphical representation of the average CW laser output power at $1.06\mu$ of the laser controlled by means of the fluidic jet shown in FIG. 1.

With valve 19 closed and no jet transecting the optical path, the CW pumped laser output from rod 14 provides a stable DC output level as shown by Curve A of FIG. 2. However, when a transecting jet of gas is interposed between rod 14 and mirror 17, refractive index gradients are produced along the optical path in the laser cavity by the gas flowing from nozzle 18. These refractive index gradients provided within the confines of the gas jet create scattering losses which are used to turn the laser on and off in a more-or-less random manner providing a random Q-switched output. The average CW power level is decreased by at least 30 percent as shown by Curve B of FIG. 2 which shows the averaged behavior of the output characteristics.

The temporal output is changed from a stable DC level to a random spiking phenomena by means of a gas jet from nozzle 18. The amplitudes of the spikes can range up to 20 times the stable DC level.

Figure 3:
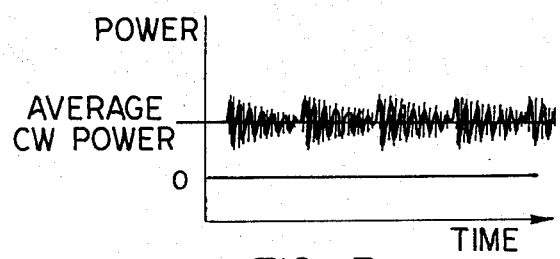
FIG. 3 is a graphical representation of the average laser output power and temporal behavior where the fluidic jet is under the control of a fluidic oscillator circuit.

By directing the fluid from source 21 through a fluidic oscillator rather than valve 19, modulation can be performed in a regular or periodic manner. A pulsating jet of gas controlled by fluidic oscillator circuit provides an output which is graphically shown in FIG. 3. Modulation of ± 80 percent about the DC level is achieved without difficulty. To achieve fast rise and fall times of the fluidic jet, a "Schmidt-Trigger" type oscillator system is preferred as the fluidic oscillator.

Greater modulation can be achieved by utilizing lenses within the cavity to focus the beam at the outlet of nozzle 18. This arrangement permits the refractive index gradients to more effectively scatter the light.

While dichlorodifluoromethane is preferred because it has a higher refractive index than air, other fluids such as water, and denser gases such as bromotrifluoromethane are also suitable. In this embodiment, however, the selection of the fluid is preferably one in which absorption within the fluid is not involved.

Figure 4:
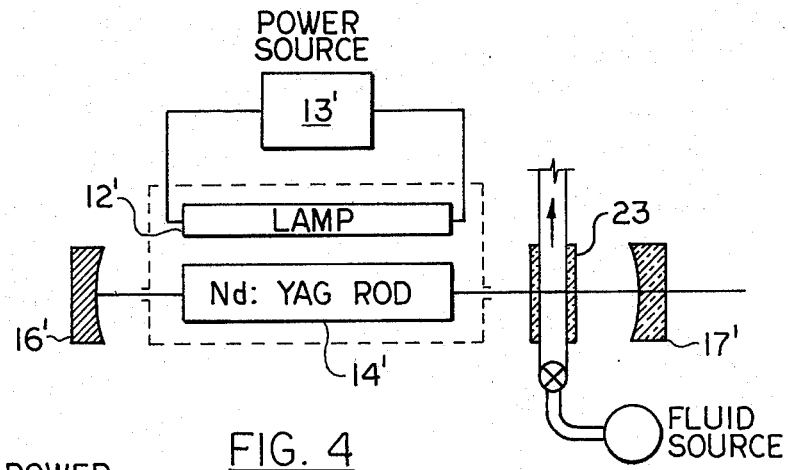
FIG. 4 is a diagrammatic view of a transparent liquid control channel positioned within an optical cavity for beam positioning.

To take advantage of the characteristics of a liquid transecting the beam, it is preferable to utilize a transparent tube 23 positioned between rod 14' and mirror 17' and across the optical axis which acts as a cylindrical lens when filled with a fluid, FIG. 4. Tube 23 is connected to a source of liquid such as water to provide a refractive index gradient within the tube. Alernatively, a channel may be substituted for tube 23 which can contain a flowing transparent liquid into which is injected a dye absorbing at the laser frequency. Injection of a dye into channel or tube 23 is preferably by means of fluidic control circuits wherein the flowing solutions follow the Coanda effect. Means and methods for achieving the preferred flow characteristics as well as control of the solutions flowing through tube 23 are disclosed in Fluidally Controlled Dye Lasers, U.S. Pat. No. 3,832,649, issued Aug. 27, 1974 assigned to the assignee of the present invention and incorporated herein by reference. In order to achieve the desired laser output control of the present invention, tube 23 would be connected to the source of flowing laser solutions in a manner analogous to the control of the laser cavity disclosed in said application.

Figure 5:
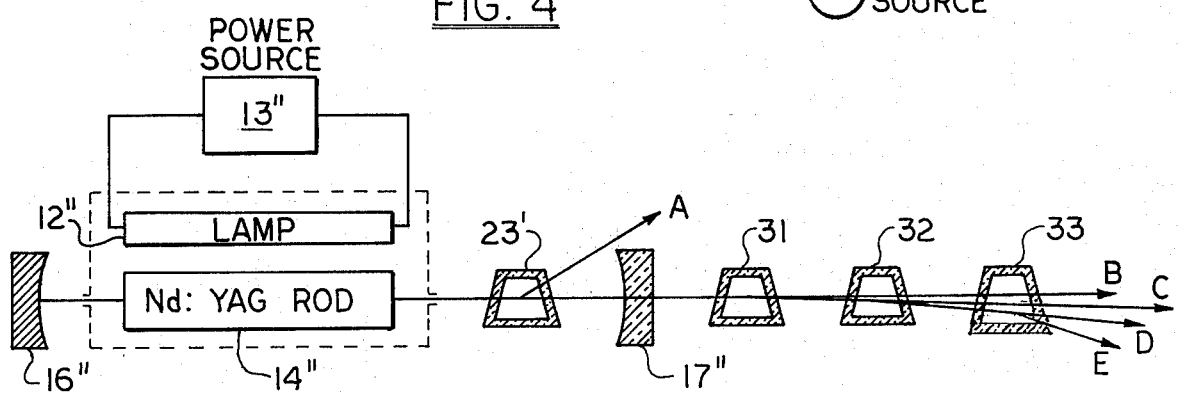
FIG. 5 is a diagrammatic view of a plurality of prismatic channels interposed along the optical axis for beam positioning and frequency-keying.

With reference to FIG. 5, channel 23' is provided with a pair of preferably Brewster angle side windows. With a liquid flow through channel 23' the refractive index of the channel is changed so that the beam is refracted along path A and out of the optical axis of device 10''. The refracted beam is, therefore, not incident upon mirror 17'' and feedback terminated consequently turning off the laser beam. Discontinuing the flow of liquid through channel 23'' permits continuation of the laser output by permitting feedback from mirror 17''.

Additional prismatic channels 31–33, preferably having Brewster angle windows aligned along the optical axis of device 10'', but outside of the optical cavity, are useful for beam positioning or to frequency-key a multi-line laser such as a krypton or argon laser.

By means of a fluid, preferably a liquid, directed through channels 31–33, the refractive indices of the channels are varied to alter the position of the beam. Thus, for example, if no fluid is directed through the channels, including channel 23', the laser beam is positioned along path B, the optical axis of device 10''. By filling channel 31, on the other hand, the beam is positioned along path C. Providing fluid in both channels 31 and 32, the beam is directed along path D and with channels 31–33 filled, the beam is directed along path E.

While presently preferred embodiments have been shown and described, the invention may otherwise be embodied within the scope of the appended claims.

What is claimed is:
1. A method for modulating a laser output, said method comprising:
   selectively transecting the optical axis of the laser with a fluid stream,
   said stream having a plurality of refractive index gradients thereacross, and
   said stream flowing such that said gradients are changing with time.
2. A method as set forth in claim 1 wherein the axis of said laser output is transected within the optical cavity of said laser.
3. A method as set forth in claim 2 wherein said fluid stream is unconfined with respect to the medium into which said fluid stream flows.
4. A method as set forth in claim 2 wherein refractive gradients are created by transecting the optical axis of said output with a fluid jet.
5. A method as set forth in claim 4 wherein said fluid is a gas.
6. A method as set forth in claim 5 including periodically transecting said laser output by pulsating said gas jet.
7. A method as set forth in claim 1 wherein said fluid is a liquid and including the additional step of containing said fluid within at least one flow channel transecting said optical axis.
8. A method as set forth in claim 7 wherein said liquid is contained within a flow channel positioned within the optical cavity of said laser.
9. A method as set forth in claim 1 wherein said stream is directed from a nozzle.
10. A method as set forth in claim 1 wherein said stream is directed from a nozzle into a fluid medium.
11. A means for modulating a laser output to provide continually variable output characteristics of a laser having an optical cavity comprising a pair of feedback mirrors positioned along the optical axis of said cavity and a lasing means positioned between said mirrors said modulating means comprising a means for transecting the optical axis with a fluid stream, said means positioned within said optical cavity between said lasing means and one of said mirrors, and said stream having a plurality of refractive index gradients thereacross, and said stream flowing such that said gradients are changing with time.

12. A means as set forth in claim 11 wherein said modulating means consists of a fluid nozzle adapted for controlled connection with a source of fluid.

13. A means as set forth in claim 12 wherein said fluid nozzle is connected to a fluidic oscillator, said fluidic oscillator being connected to a source of pressurized fluid.

14. A means as set forth in claim 11 wherein said modulating means comprises a transparent channel positioned to transect said optical axis and adapted for connection to a source of fluid.

15. A means as set forth in claim 11 wherein said fluid stream is unconfined with respect to the medium into which said fluid stream flows.

* * * * *